United States Patent [19]

Sherman, Jr.

[11] 3,925,714

[45] Dec. 9, 1975

[54] CONSTANT CURRENT BATTERY CHARGING CIRCUIT

[75] Inventor: Ralph R. Sherman, Jr., Forest, Va.

[73] Assignee: General Electric Company, Lynchburg, Va.

[22] Filed: Sept. 26, 1974

[21] Appl. No.: 509,359

[52] U.S. Cl. .................. 320/39; 320/32; 323/4; 323/225 CR
[51] Int. Cl.² ............................................. H02J 7/04
[58] Field of Search ............ 320/39, 40, 32; 323/4, 323/22 T, 225 CR

[56] References Cited
UNITED STATES PATENTS

| | | | |
|---|---|---|---|
| 3,383,584 | 5/1968 | Atherton | 320/39 X |
| 3,602,794 | 8/1971 | Westhaver | 320/39 |

Primary Examiner—J. D. Miller
Assistant Examiner—Robert J. Hickey

[57] ABSTRACT

A constant current battery charging circuit is provided by a current control device which supplies rectified charging current at a magnitude determined by the time occurrence of a control signal applied to the control device. The control signal is produced in response to a sawtooth voltage exceeding an error signal. The error signal is produced in response to the relative magnitudes of a voltage indicating charging current and a reference voltage.

3 Claims, 2 Drawing Figures

CONSTANT CURRENT BATTERY CHARGING CIRCUIT

BACKGROUND OF THE INVENTION

My invention relates to a battery charging circuit, and particularly to a battery charging circuit that maintains a constant charging current despite variations in the battery voltage or the line voltage.

Storage batteries, particularly of the nickel-cadmium type, are used extensively in electronic devices such as personal or portable radios. When the storage batteries become discharged, it is desirable that they be recharged as quickly as possible for further use. Such quick recharging requires a relatively large current to be maintained, despite an increase in battery voltage, until the battery reaches a desired charge, after which the charging current is cut off. Usually, the battery charging current is supplied from an alternating current voltage source such as the generally available 60 hertz power. However, the voltage magnitude of such sources is subject to wide variations. As a result, previous chargers were not able to provide the desired constant charging current as the battery voltage increased or as the source voltage varied.

Accordingly, a primary object of my invention is to provide a new and improved battery charging circuit that maintains a selected magnitude of charging current substantially constant despite changes in the battery voltage or variations in the supply voltage.

Another object of my invention is to provide a new and improved constant current battery charging circuit that wastes very little electrical energy, particularly in the form of heat.

SUMMARY OF THE INVENTION

Briefly, these and other objects are achieved in accordance with may invention by a constant current charging circuit having main input terminals for connection to an alternating current voltage source, and main output terminals for connection to a battery to be charged. A rectifier circuit has its input terminals connected to the main input terminals for producing rectified alternating current voltage at its output terminals. A current control device having an anode-cathode path and a control electrode is provided. The anode-cathode path is connected in series with a current sensing device between the rectifier output terminals and the main output terminals. Means are connected to the rectifier circuit for producing a sawtooth voltage from the rectified alternating current voltage. A reference voltage of selected magnitude is provided. Means are connected to the current sensing device for producing a voltage indicative of the charging current through that device. Comparing means are connected to the reference voltage and to the current magnitude voltage for producing an error voltage indicative of the relative magnitudes. Means are connected to the error voltage and to the sawtooth voltage for providing a control signal in response to the sawtooth voltage exceeding the error voltage. The control signal is applied to the control device control electrode for causing the anode-cathode path to conduct current in response to the control signal. This current remains substantially constant despite variations in the alternating current voltage applied to the main input terminals, or variations in the battery voltage.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF A PREFERRED EMBODIMENT

Figure 1:
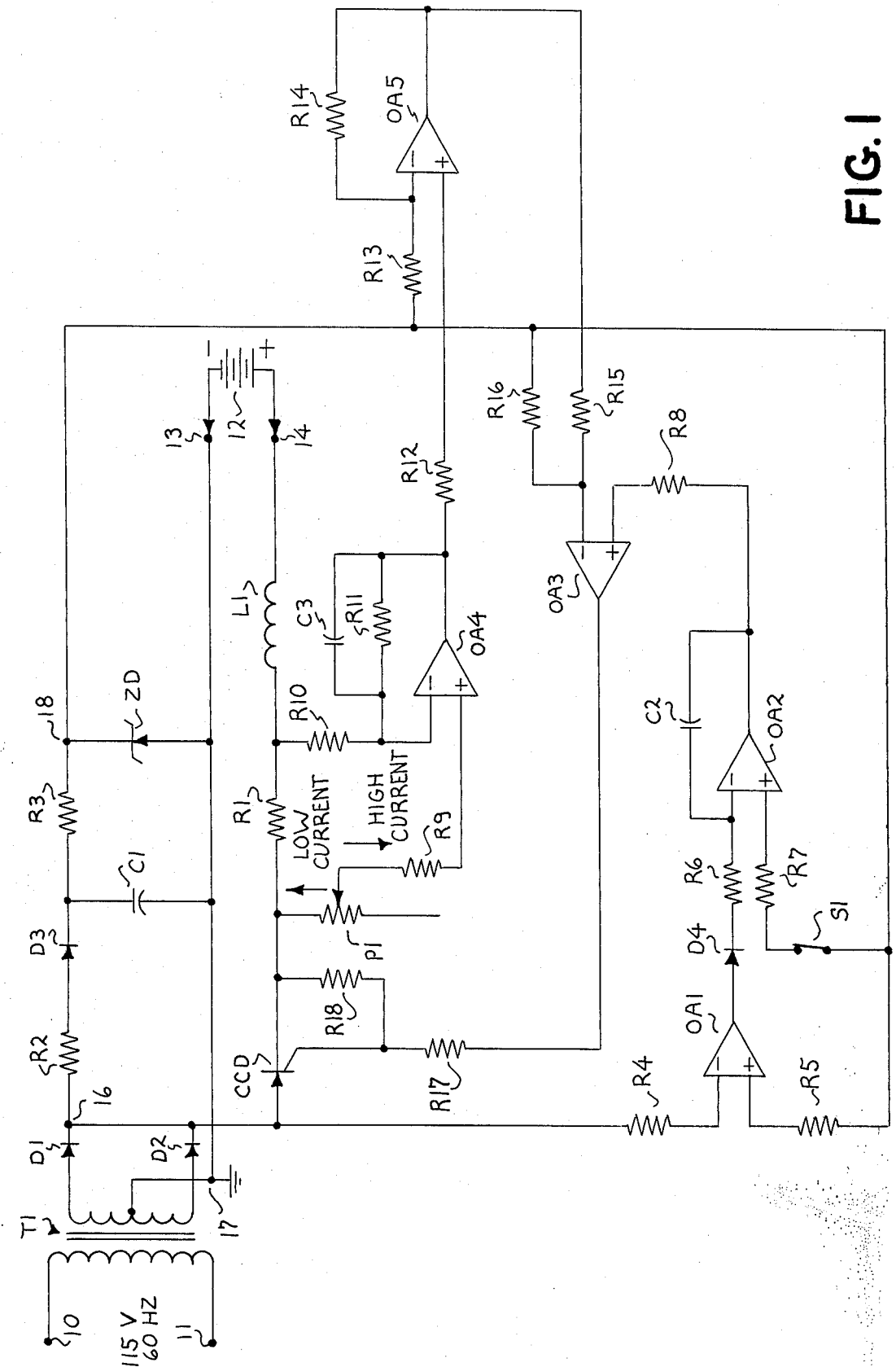
FIG. 1 shows a schematic diagram of a preferred embodiment of a constant current battery charging circuit in accordance with my invention.

In FIG. 1, I have assumed that my charging circuit is energized by conventional 115 volt, 60 hertz alternating current power which would be applied to main input terminals 10, 11. A battery 12 which is to be charged would be connected to main output terminals 13, 14. While the battery 12 may have various rated values, I have assumed that it is less than the 115 volt, 60 hertz power so that a stepdown transformer T1 is provided. The primary winding of the transformer T1 is connected to the main input terminals 10, 11. The ends of the secondary winding of the transformer T1 are connected to the input terminals of a rectifier, which I have assumed to be a full-wave rectifier comprising two diode rectifiers D1, D2, Such a rectifier requires that the secondary winding be center tapped. However, it is to be understood that a half-wave rectifier may be provided, or that a bridge rectifier may be provided so as to eliminate the center tap. In the rectifier shown, the anodes of the rectifiers D1, D2 serve as the rectifier input terminals. The cathodes of the rectifiers D1, D2 are connectrd to a positive output terminal 16 of the rectifier. The center tap of the secondary winding is connected to a negative output terminal 17 of the rectifier. This output terminal 17 may be connected to a common point or ground as shown. The positive rectifier output terminal 16 is connected to the anode of the anode-cathode path of a current control device CCD, which I have assumed to be an ordinary silicon control rectifier. The anode-cathode path of the current control device CCD is connected in a series circuit with a current indicating resistor R1 and an inductor L1 (which limits the rate of change of the charging current), and this series circuit is connected between the positive rectifier output terminal 16 and the main output terminal 14. The negative rectifier output terminal 17 is connected directly to the other main output terminal 13. As will be explained, the charging current supplied to the battery 12 is determined by the time at which the current control device CCD is turned on in each half cycle of the rectified alternating current. If the current control device CCD is a silicon control rectifier, the device CCD is turned on by a positive voltage applied to its control electrode.

In addition to this charging path, I also provide a reference voltage for use with the remainder of my circuit. This reference voltage is provided by a circuit having a resistor R2, a diode rectifier D3, a filter capacitor C1, a further resistor R3, and a voltage reference device such as a zener diode ZD connected as shown. This circuit as just described is conventional, and provides a relatively steady reference voltage at a reference voltage output terminal 18, despite changes in the source voltage at the terminals 10, 11.

The remainder of my charging circuit utilizes five operational amplifiers OA1 through OA5. These operational amplifiers are commercially available devices which are connected or arranged to operate in a voltage or current comparator fashion, and are powered by any available voltage, such as the reference voltage. The amplifiers have two input signal terminals, designated plus and minus, an output signal terminal, and a common terminal (not shown) for the input and output terminals. These common terminals are connected to ground or some common point. When such an amplifier is operated, if the current at the plus terminal exceeds the current at the minus terminal, a relatively high positive output is produced. Conversely, if the current at the minus terminal exceeds the current at the plus terminal, then the output is relatively low or may approach zero. The operational amplifier OA1 has its minus terminal connected through a resistor R4 to the rectifier output terminal 16 and its plus terminal connected through a resistor R5 to the reference terminal 18. The voltage at the minus terminal of the operational amplifier OA1 is a full-wave rectified 60 hertz sine wave. Whenever this sine wave approaches a value lower than the reference voltage at the plus terminal, the operational amplifier OA1 produces a positive reset pulse having a time duration determined primarily by the time the current from the reference terminal 18 exceeds the rectified sine wave current. This reset pulse is applied through a diode rectifier D4 and a resistor R6 to the minus terminal of the operational amplifier OA2. The plus terminal of the operational amplifier OA2 is connected through a resistor R7 and a switch S1 to the reference terminal 18. The output of the operational amplifier OA2 is connected through a charging capacitor C2 to the minus terminal. The operational amplifier OA2 produces a sawtooth voltage which rises in response to the voltage supplied at its plus terminal until a reset pulse is produced by the operational amplifier OA1. The reset pulse sets the output of the operational amplifier OA2 back to zero for sufficient time to fully discharge the capacitor C2. At the end of the reset pulse, the capacitor C2 begins to charge again and the output of the operational amplifier OA2 begins to increase linearly again. Thus, a very linear sawtooth voltage is provided. This sawtooth voltage is very linear because the charge current in the capacitor C2 is constant and equal in magnitude to the current flow through the resistor R7. This sawtooth voltage is applied through a resistor R8 to the plus terminal of the control operational amplifier OA3. As will be explained, the minus terminal of the operational amplifier OA3 is supplied with an error voltage indicative of the relative magnitudes of the actual charging current and a reference voltage.

In the charging path, the resistor R1 produces a voltage having a magnitude indicative of the charging current. This voltage is applied through an adjustable potentiometer P1 (whose resistance is increased for high charging current and decreased for low charging current) and a resistor R9 to the plus terminal of the operational amplifier OA4, and through a resistor R10 to the minus terminal of the operational amplifier OA4. A feedback circuit comprising a resistor R11 and a capacitor C3 is connected between the output terminal and the minus terminal of the operational amplifier OA4. The capacitor C3 makes the amplifier OA4 act on an integrator causing a direct current voltage to be produced at the output of the amplifer OA4 which is a function of the charge current pulses sensed by the resistor R1. The resistor R11 establishes the direct current gain of the amplifier OA4. The output voltage of the operational amplifier OA4 is applied through a reistor R12 to the plus terminal of the comparing operational amplifier OA5.

The minus terminal of the amplifier OA5 is connected through a resistor R13 to the reference voltage terminal 18. A feedback resistor R14 is connected between the output terminal and the minus terminal of the operational amplifier OA5 to establish the gain of the amplifier OA5. The output of the operational amplifier OA5 produces an error voltage whose magnitude indicates the relative magnitudes of the charging current voltage (across the resistor R1) and the reference voltage. This error voltage is applied through a resistor R15 to the minus terminal of the operational amplifier OA3. The minus terminal of this amplifier OA3 may be connected through a resistor R16 to the reference terminal 18 for insuring that the circuit can be turned off by the switch S1. With respect to the operational amplifier OA3, whenever the sawtooth voltage at its plus terminal exceeds the error voltage at the minus terminal, a control signal is produced and applied through a resistor R17 to the control electrode of the current control device CCD. A resistor R18 is connected between the control electrode and the cathode to insure that the current control device CCD is cut off at the end of each half cycle. The resistor R18 also reduces chances of the device CCD being accidentally turned on by direct current leakages, such as the leakage current path from the anode to the control electrode which would turn the device CCD on.

Figure 2:
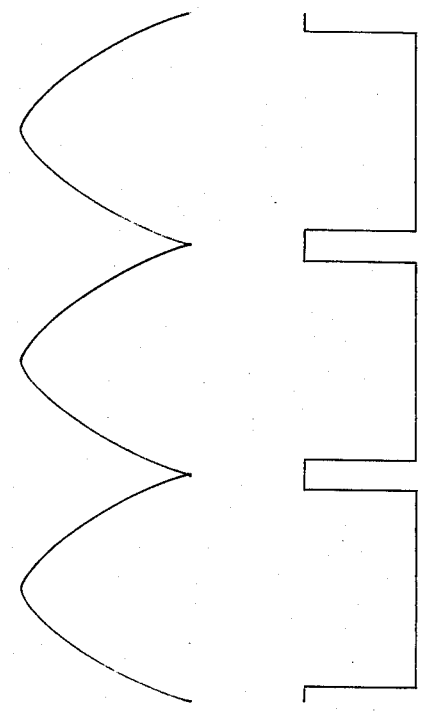
FIG. 2 shows wave forms for illustrating the operation of my charging circuit of FIG. 1.
Figure 2:
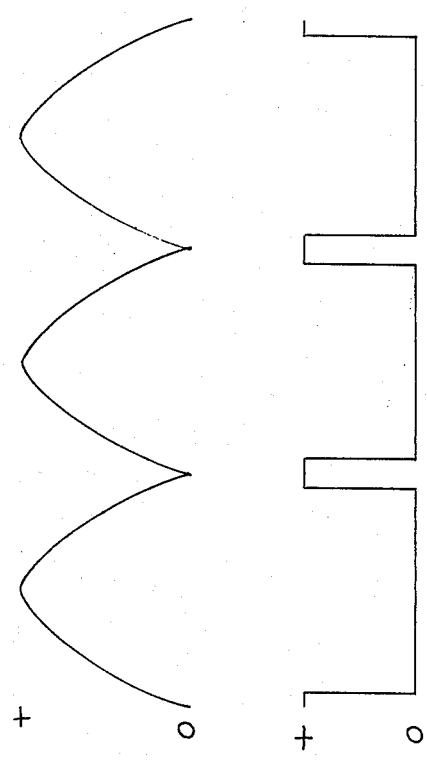
Figure 2:
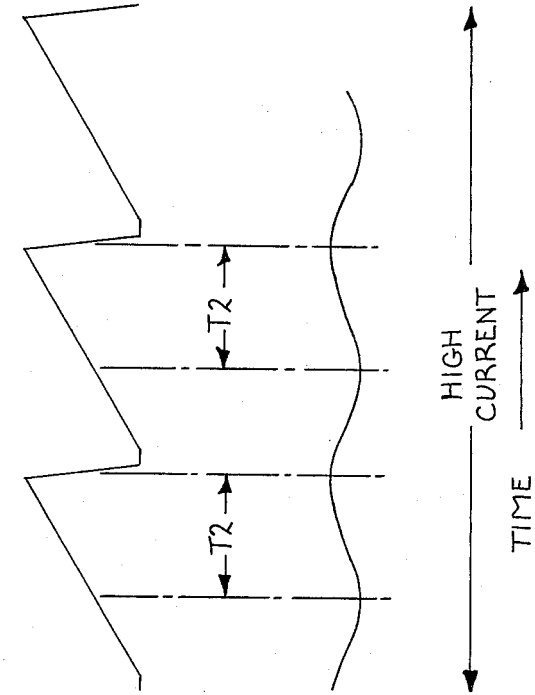
Figure 2:
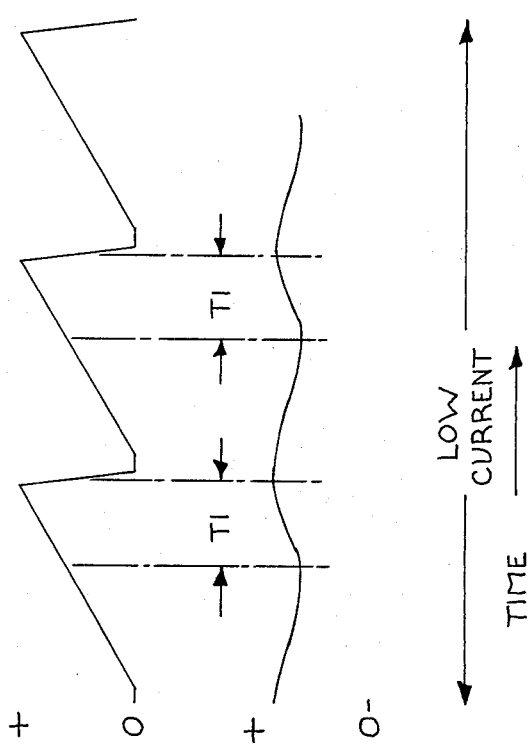

The operation of my circuit of FIG. 1 will be explained in connection with the wave forms shown in FIG. 2. In FIG. 2, the wave forms represent two conditions indicated at the bottom. The four left hand wave forms illustrate the operation where the potentiometer P1 is set for a relatively low current, and the four right hand wave forms illustrate the operation where the potentiometer P1 is set for a relatively high current. FIG. 2A shows the full wave rectified alternating current voltage appearing at the rectifier output terminal 16 with respect to ground. This voltage causes charging current to flow through the control device CCD when a control signal is applied to its control electrode. FIG. 2B shows the reset pulses porduced at the output of the operational amplifier OA1. FIG. 2C shows the sawtooth voltages produced at the output of the operational amplifier OA2. It will be noticed that these three sets of wave forms shown in FIGS. 2A, 2B, and 2C are the same for both the low current and the high current conditions. FIG. 2D shows the error voltage produced at the output of the operational amplifier OA5, and it will be noticed that these voltages are different for the low current and the high current conditions.

The rectifier output shown in FIG. 2A is the well known rectified 60 hertz voltage. This voltage is applied to the minus terminal of the operational amplifier OA1, and when its magnitude approaches zero, the reference voltage at the plus terminal of the operational amplifier OA1 causes the amplifier OA1 to produce the positive reset pulses shown in FIG. 2B. The time width of these reset pulses is proportional to the time that the reference voltage current exceeds the rectified current. These reset pulses are applied to the minus terminal of the operational amplifier OA2, and discharge the capacitor C2 by their positive excursion. After the reset pulses of FIG. 2B return to zero, the positive voltage at the plus terminal of the operational amplifier OA2 causes the capacitor C2 to be charged and produce the sawtooth voltage shown in FIG. 2C. This sawtooth voltage is applied to the plus terminal of the operational amplifier OA3. When the potentiometer P1 is set for a relatively low charging current, it applies a more positive voltage to the plus terminal of the operational amplifier OA4. This causes the amplifier OA4 to produce a more positive output. With a set reference voltage at the minus terminal of the amplifier OA5, the more positive voltage at the plus terminal of the amplifier OA5 causes the output of the operational amplifier OA5 to become more positive. As a result, the sawtooth voltage applied to the plus terminal of the operational amplifier OA3 exceeds this error voltage for a relatively short period of time T1, as indicated between the dashed lines shown between FIGS. 2C and 2D. Hence, the current control device CCD is turned or gated on for only a relatively short time. If the potentiometer P1 is set for a relatively high current, the output of the operational amplifier OA4 decreases, with the result that the output of the operational amplifier OA5 also decreases. This results in the sawtooth voltage shown in FIG. 2C exceeding the error voltage for a longer period of time T2, as indicated between the dashed lines between FIGS. 2C and 2D. Thus, the current magnitude can be set by adjustment of the potentiometer P1.

The circuit as described provides a substantially constant charging current despite changes in line voltage or changes in the battery voltage. Because of the relatively steady reference voltage applied to the plus inputs, the amplifiers OA1 and OA2 are not affected appreciably by changes in line voltage, so that the sawtooth voltage of FIG. 2C remains substantially the same despite such variations. However, if the line voltage does decrease, the charging current tends to decrease through the resistor R1. This has the same effect as increasing the resistance of the potentiometer P1, so that the error voltage produced by the operational amplifier OA5 also decreases. As a result, the control device CCD is turned on earlier or for a longer period of time to provide the desired current. Conversely, if the line voltage increases, this has the effect of producing a greater voltage across the resistor R1. This is the same as decreasing the resistance of the potentiometer P1, so that a greater error voltage is produced. This causes the control signal to have a shorter duration, with the result that the current control device CCD conducts for a shorter period of time to provide the desired current.

The embodiment of FIG. 1 was constructed with components having the following values or characteristics:

| | |
|---|---|
| Transformer T1 | 115 volt primary, 32 volt center tapped secondary. |
| Diodes D1, D2, D3, D4 Current Control Device CCD Zener Diode ZD | To meet circuit voltages and currents. |
| Operational Amplifiers A1 - OA5 | Similar to Motorola MC3401 |
| Resistor R1 | 0.39 ohm |
| R2 | 47 ohms |
| R3 | 3000 ohms |
| R4 | 330,000 ohms |
| R5 | 1 megohm |
| R6 | 100,000 ohms |
| R7 | 1 megohm |
| R8 | 100,000 ohms |

-continued

| | |
|---|---|
| R9 | 82,000 ohms |
| R10 | 100,000 ohms |
| R11 | 1 megohm |
| R12 | 1 megohm |
| R13 | 1 megohm |
| R14 | 5 megohms |
| R15 | 330,000 ohms |
| R16 | 1 megohm |
| R17 | 1000 ohms |
| R18 | 10,000 ohms |
| P1 | 50,000 ohms |
| C1 | 100 microfarads |
| C2 | .01 microfarad |
| C3 | .22 microfarad |
| L1 | 1 millihenry |

This circuit permitted any desired charging current up to 1 ampere. Very little power or heat loss occurred in the control device CCD or the 0.39 ohm current indicating resistor R1. If the resistor R1 is reduced to 0.1 ohm, currents up to 4 amperes can be provided.

It will thus be seen that I have provided a new and improved charging circuit which provides a substantially constant charging circuit despite variations in line voltage, and despite changes in battery voltage. Typically, battery voltages increase with charge, and it may be desirable to maintain constant current despite such increases. The operational amplifiers and resistors lend themselves to low power microelectronic circuits. In my circuit, it is desirable that some means be provided for stopping the charging current when the battery has been charged to the desired level. Such stopping means can be provided in a number of ways, such as by temperature sensing devices for nickel-cadmium batteries, or such as voltage sensing arrangements. Whatever device is employed, it can be connected to open the switch S1 when the charge has reached a desired magnitude. When the switch S1 is opened, the charging signal is removed from the capacitor C2, and only reset pulses are applied. Thus, no sawtooth voltage is produced, and no charging can take place. In this regard, the resistor R16 may be omitted, although I prefer to include it to insure that the current control device CCD is not turned on when the sawtooth voltage and the error signal are very low, as they would be when the switch S1 is opened. Persons skilled in the art will appreciate that modifications may be made. For example, the setting for the charging current may be provided by a potentiometer in series with the resistor R12, or the resistor R10, or the resistor R13. And as already mentioned, various rectifier circuits can be used in place of the rectifiers D1, D2 as shown. And finally, the control device CCD, the current sensing resistor R1, and the inductor L1 may be placed in any order in series with the charging path. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved battery charging circuit comprising:
   a. main input terminals adapted to be connected to a source of alternating current;
   b. main output terminals adapted to be connected to a battery to be charged;
   c. a rectifier circuit having input terminals connected to said main input terminals and having output terminals for producing rectified alternating current;

d. a reference voltage circuit connected to said rectifier output terminals for producing a direct current reference voltage;

e. a first operational amplifier having first input terminals connected to said rectifier output terminals, second input terminals connected to said reference voltage circuit, and output terminals for producing reset pulses;

f. a second operational amplifier having first input terminals connected to said first operational amplifier output terminals, second input terminals connected to said reference voltage circuit, output terminals, and a capacitor connected between one of said output terminals and one of said first input terminals for producing a sawtooth voltage at said output terminals;

g. a current control device having an anode-cathode path connected in series between said rectifier output terminals and said main output terminals, and having a control electrode;

h. a current sensing resistor connected in series with said anode-cathode path of said current control device;

i. a third operational amplifier having first input terminals, second input terminals connected to said second operational amplifier output terminals, and output terminals;

j. a fourth operational amplifier having first input terminals connected to said reference voltage circuit, second input terminals connected to said current sensing resistor, and output terminals for producing an error signal indicative of the relative magnitude of the current in said resistor and a selected reference current;

k. means connecting said fourth operational amplifier output terminals to said first input terminals of said third operational amplifier for permitting said third operational amplifier to produce a control signal in response to said sawtooth voltage exceeding said error signal;

l. and means connecting said output terminals of said third operational amplifier to said control electrode for causing said current control device to conduct in response to said control signal.

2. The improved battery charging circuit of claim 1 wherein said rectifier circuit provides full wave rectification.

3. The improved battery charging circuit of claim 1, and further comprising a switch connected between said second input terminals of said second operational amplifier and said reference voltage circuit for stopping the charging circuit when desired.

* * * * *

UNITED STATES PATENT OFFICE
CERTIFICATE OF CORRECTION

PATENT NO. : 3,925,714

DATED : December 9, 1975

INVENTOR(S) : Ralph R. Sherman, Jr.

It is certified that error appears in the above-identified patent and that said Letters Patent are hereby corrected as shown below:

| | |
|---|---|
| Col. 1, line 39 | cancel "may" and insert -- my -- |
| Col. 4, line 49 | cancel "porduced" and insert -- produced -- |
| Col. 5, line 63 | cancel "Al" and insert -- OAl -- |

Signed and Sealed this fourth Day of May 1976

[SEAL]

Attest:

RUTH C. MASON
Attesting Officer

C. MARSHALL DANN
Commissioner of Patents and Trademarks